(12) United States Patent
Stark

(10) Patent No.: US 7,336,309 B2
(45) Date of Patent: Feb. 26, 2008

(54) DYNAMIC RANGE COMPRESSION METHOD

(75) Inventor: Moshe Stark, Even Yehuda (IL)

(73) Assignee: Vision-Sciences Inc., Rangeburg, NY (US)

( * ) Notice: Subject to any disclaimer, the term of this patent is extended or adjusted under 35 U.S.C. 154(b) by 561 days.

(21) Appl. No.: 10/332,151

(22) PCT Filed: Jul. 3, 2001

(86) PCT No.: PCT/IL01/00612

§ 371 (c)(1),
(2), (4) Date: Jan. 6, 2003

(87) PCT Pub. No.: WO02/03675

PCT Pub. Date: Jan. 10, 2002

(65) Prior Publication Data

US 2004/0036797 A1     Feb. 26, 2004

(51) Int. Cl.
*H04N 5/335* (2006.01)

(52) U.S. Cl. ..................... 348/297; 348/294

(58) Field of Classification Search ............ 348/297, 348/294, 308, 310
See application file for complete search history.

(56) References Cited

U.S. PATENT DOCUMENTS

| | | | |
|---|---|---|---|
| 3,911,467 A | 10/1975 | Levine et al. | |
| 4,212,034 A | 7/1980 | Kokie et al. | |
| 4,471,228 A | 9/1984 | Nishizawa et al. | |
| 4,472,638 A | 9/1984 | Nishizawa et al. | |
| 4,583,002 A | 4/1986 | Kondo et al. | |
| 4,635,126 A | 1/1987 | Kinoshita | |
| 4,706,123 A | 11/1987 | Chautemps | |
| 4,758,734 A | 7/1988 | Uchida et al. | |
| 4,761,689 A | 8/1988 | Takatsu et al. | |
| 4,779,004 A * | 10/1988 | Tew et al. ............... | 348/164 |
| 4,839,735 A | 6/1989 | Kyomasu et al. | |
| 4,870,266 A | 9/1989 | Ishizaki et al. | |
| 4,935,636 A | 6/1990 | Gural | |
| 4,942,473 A | 7/1990 | Zeevi et al. | |
| 4,974,093 A | 11/1990 | Murayama et al. | |
| 4,984,002 A | 1/1991 | Kokubo | |
| 4,996,600 A | 2/1991 | Nishida et al. | |
| 5,049,752 A | 9/1991 | Kalaf et al. | |

(Continued)

FOREIGN PATENT DOCUMENTS

EP         0757476        5/1997

(Continued)

OTHER PUBLICATIONS

U.S. Appl. No. 09/426,452, filed Oct. 25, 1999, Stark.

(Continued)

*Primary Examiner*—Lin Ye
*Assistant Examiner*—Nicholas G Giles
(74) *Attorney, Agent, or Firm*—Womble Carlyle

(57) ABSTRACT

A method for compressing the dynamic range of an image sensor (202) including a multiplicity of pixels. The method includes the steps of exposing each of the pixels to light and producing an associated photocurrent per pixel, representative of the light exposure. Then, on a per-pixel basis, controlling exposure time of each of the pixels on the basis of a monotonically rising convex function of the associated photocurrent of each of the pixel.

17 Claims, 7 Drawing Sheets

U.S. PATENT DOCUMENTS

| | | | |
|---|---|---|---|
| 5,060,245 A | 10/1991 | Nelson | |
| 5,218,462 A * | 6/1993 | Kitamura et al. | 358/473 |
| 5,220,170 A | 6/1993 | Cox et al. | |
| 5,227,313 A | 7/1993 | Gluck et al. | |
| 5,262,871 A | 11/1993 | Wilder et al. | |
| 5,264,944 A | 11/1993 | Takemura | |
| 5,278,660 A | 1/1994 | Sugiki | |
| 5,291,294 A | 3/1994 | Hirota | |
| 5,323,186 A | 6/1994 | Chow et al. | |
| 5,351,309 A | 9/1994 | Lee et al. | |
| 5,354,980 A | 10/1994 | Rappoport et al. | |
| 5,369,047 A | 11/1994 | Hynecek | |
| 5,396,091 A | 3/1995 | Kobayashi et al. | |
| 5,452,004 A | 9/1995 | Roberts | |
| 5,461,491 A | 10/1995 | Degi et al. | |
| 5,463,421 A | 10/1995 | Deguchi et al. | |
| 5,471,515 A | 11/1995 | Fossum et al. | |
| 5,481,301 A | 1/1996 | Cazaux et al. | |
| 5,485,004 A | 1/1996 | Suzuki et al. | |
| 5,521,366 A | 5/1996 | Wang et al. | |
| 5,539,461 A | 7/1996 | Andoh et al. | |
| 5,541,402 A | 7/1996 | Ackland et al. | |
| 5,541,654 A | 7/1996 | Roberts | |
| 5,546,127 A | 8/1996 | Yamashita et al. | |
| 5,563,405 A | 10/1996 | Woolaway, II et al. | |
| 5,576,762 A | 11/1996 | Udagawa | |
| 5,576,763 A | 11/1996 | Ackland et al. | |
| 5,592,219 A | 1/1997 | Nakagawa et al. | |
| 5,604,534 A * | 2/1997 | Hedges et al. | 348/144 |
| 5,619,262 A | 4/1997 | Uno et al. | |
| 5,638,120 A | 6/1997 | Mochizuki et al. | |
| 5,638,123 A | 6/1997 | Yamaguchi | |
| 5,650,352 A | 7/1997 | Kamasz et al. | |
| 5,666,567 A | 9/1997 | Kusaka | |
| 5,694,495 A | 12/1997 | Hara et al. | |
| 5,712,682 A | 1/1998 | Hannah | |
| 5,721,425 A | 2/1998 | Merrill | |
| 5,739,562 A | 4/1998 | Ackland et al. | |
| 5,742,659 A | 4/1998 | Atac et al. | |
| 5,812,191 A | 9/1998 | Orava et al. | |
| 5,835,141 A | 11/1998 | Ackland et al. | |
| 5,841,126 A | 11/1998 | Fossum et al. | |
| 5,841,159 A | 11/1998 | Lee et al. | |
| 5,854,498 A | 12/1998 | Merrill | |
| 5,856,667 A | 1/1999 | Spirig et al. | |
| 5,867,215 A | 2/1999 | Kaplan | |
| 5,877,808 A | 3/1999 | Iizuka | |
| 5,881,159 A | 3/1999 | Aceti et al. | |
| 5,887,204 A | 3/1999 | Iwasaki | |
| 5,892,541 A | 4/1999 | Merrill | |
| 5,896,172 A | 4/1999 | Korthout et al. | |
| 5,949,483 A | 9/1999 | Fossum et al. | |
| 5,955,753 A | 9/1999 | Takahashi | |
| 5,969,759 A | 10/1999 | Morimoto | |
| 5,973,311 A | 10/1999 | Sauer et al. | |
| 6,078,037 A | 6/2000 | Booth, Jr. | |
| 6,091,449 A | 7/2000 | Matsunaga et al. | |
| 6,115,065 A | 9/2000 | Yadid-Pecht et al. | |
| 6,122,008 A | 9/2000 | Komobuchi et al. | |
| 6,137,533 A | 10/2000 | Azim | |
| 6,141,049 A | 10/2000 | Harada | |
| 6,166,367 A | 12/2000 | Cho | |
| 6,243,134 B1 | 6/2001 | Beiley | |
| 6,252,217 B1 | 6/2001 | Pyyhtia et al. | |
| 6,300,977 B1 | 10/2001 | Waechter et al. | |
| 6,452,633 B1 | 9/2002 | Merrill et al. | |
| 6,529,241 B1 | 3/2003 | Clark | |
| 6,606,121 B1 * | 8/2003 | Bohm et al. | 348/297 |
| 6,657,664 B2 | 12/2003 | Ueno | |
| 6,801,258 B1 | 10/2004 | Pain et al. | |
| 6,956,605 B1 | 10/2005 | Hashimoto | |
| 2002/0101528 A1 * | 8/2002 | Lee et al. | 348/308 |
| 2002/0179820 A1 | 12/2002 | Stark | |
| 2002/0186312 A1 | 12/2002 | Stark | |
| 2003/0201379 A1 | 10/2003 | Stark | |

FOREIGN PATENT DOCUMENTS

| | | |
|---|---|---|
| GB | 2181010 | 4/1987 |
| JP | 05145959 A | 6/1993 |
| JP | 05340810 | 12/1993 |
| JP | 06339085 | 12/1994 |
| JP | 09275525 A | 10/1997 |
| WO | WO 97/17800 | 5/1997 |
| WO | WO 97/28641 | 8/1997 |
| WO | WO-99/33259 | 7/1999 |
| WO | WO-01/10117 | 2/2001 |

OTHER PUBLICATIONS

U.S. Appl. No. 09/516,168, filed Feb. 29, 2000, Stark.

U.S. appl. No. 09/629,703, filed Jul. 31, 2000, Stark.

Fossum et al., "Application of the Active Pixel Sensor Concept to Guidance and Navigation", SPIE vol. 1949, paper 30, 1993.

Roger Paniacci et al., "Programmable multiresolution CMOS active pixel sensor", 72/SPIE, vol. 2654, 1996, pp. 72-79.

Zhimin Zhou et al., "Frame Transfer CMOS Active Pixel Sensor with Pixel Binning", IEEE Transactions on Electron Devices, vol. 44, No. 10, Oct. 1997, pp. 1764-1768.

Lisa G. McIlrath et al., "Design and Analysis of 512×768 Current-Mediated Active Pixel Array Image Sensor", IEEE Transactions on Electron Devices, vol. 44, No. 10, Oct. 1997, pp. 1706-1715.

R. Daniel McGrath et al., "Current Mediated, Current-Reset 768×512 Active Pixel Sensory Array", ISC97/Session 11/Imaging Circuits and Systems/Paper FA 11.2, p. 182-183.

Chih-Cheng Hseih et al., "A new Cryogenic CMOS Readout Structure for Infrared Focal Plane Array", IEEE Journal of Solid-State Circuits, vol. 32, No. 8, Aug. 1997, pp. 1192-1199.

Nanyoung Yoon et al., "A New Unit Cell of Current Mirroring Direct Injection Circuit for Focal Plane Arrays", SPIE, vol. 3061, pp. 93-101.

J. R. Willison, "Signal Detection and Analysis", Handbook of optics, vol. 1, Part 6, Chapter 18, McGraw Hill, 1995.

T. J. Tredwell, "Visible Array Detectors", Handbook of Optics, vol. 1, Part 6, Chapter 22, McGraw Hill, 1995.

L. J. Kozlowski and W. F. Kosonocky, "Infrared Detector Arrays", Handbook of Optics, vol. 1, Part 6, Chapter 23, McGraw Hill, 1995.

Eric R. Fossum and Bedabrata Pain, "Infrared Readout Electronics for Space Science Sensors: State of the Art and Future Directions", SPIE, vol. 2020, Infrared Technology XIX (1993), pp. 262-285.

Orly Yadid Pecht et al.: "Optimization of Noise and Responsivity in CMOS Active Pixel Sensors for Detection of Ultra Low Light Levels", SPIE vol. 3019, 0277-786X/97, pp. 125-136.

Eric R. Fossum—"Ultra Low Power Imaging Systems Using CMOS Image Sensor Technology", SPIE vol. 2267, 0-8194-1591-C/94, pp. 107-111.

Eric R. Fossum: "Active Pixel Sensors: Are CCD's Dinosaurs?", SPIE vol. 1900, 0-8194-1133-7/93, pp. 2-14.

Wolfgang Wittenstein et al: "Simulation Study on Fixed Pattern Noise and MRTD", SPIE vol. 2552, 0-8194-1911-7/95, pp. 489-501.

E. Mottin et al.: "An Improved Architecture of IRFPA Readout Circuits", SPIE vol. 3061, 0277-786X/97, pp. 117-126.

B. Pain et al.: "Low-Power, Low-Noise Analog Circuits for on Focal-Plane Signal Processing of Infrared Sensors", in Infrared Detectors and Instrumentation, Pro. SPIE, vol. 1946, pp. 365-374, 1993.

Steven Decker et al.: "A 256×256 CMOS Imaging Array with Wide Dynamic Range Pixels and a Column-Parallel Digital Output", IEEE Journal of Solid-State Circuits, vol. 33, No. 12, Dec. 1998, pp. 2081-2091.

Chih-Cheng et al.: "A new CMOS Readout Circuit Design for IRFPA with Adaptive Gain Control and Current-Mode Background Suppression", 0-7803-3073-0/96, 1996 IEEE, pp. 137-140.

Hon-Sum Wong: "Technology and Device Scaling Considerations for CMOS Imagers", IEEE Transactions on Electron Devices, vol. 43, No. 12, Dec. 1996, pp. 2131-2142.

Hon-Sum Wong et al.: "CMOS Active Pixel Image Sensors Fabricated Using a 1.8V, 0.25 μm CMOS Technology", 0-7803-3393-4, 1996 IEEE, IEDM 96-915, pp. 35.5.1-35.5.4.

Orly Yadid-Pecht et al. "Wide Intrascene Dynamic Range CMOS APS Using Dual Sampling," IEEE Trans. on Electron Devices, vol. 44, No. 10, Oct. 1997, pp. 1721-1723.

Orly Yadid-Pecht et al., "CMOS Active Pixel Sensor Star Tracker with Regional Electronic Shutter," IEEE Journal of Solid State Circuits, vol. 32, No. 2, Feb. 1997, pp. 285-288.

Orly Yadid-Pecht et al., "Wide Dynamic Range APS Star Tracker," SPIE, vol. 2654, 1996, pp. 82-92.

Christopher Clark et al., "Application of APS Arrays to Star and Feature Tracking Systems," SPIE, vol. 2810, 1996, pp. 116-120.

Orly Yadid-Pecht et al., "A Random Access Photodiode Array for Intelligent Image Capture," IEEE Transactions on Electron Devices, vol. 28, No. 8, Aug. 1991, pp. 1772-1780.

G.P. Weckler, "Operation of p-n junction photodetectors in photon flux integration mode," IEEE JSSC, vol. SC-2, No. 3, Sep. 1967.

R. Dyck and G. Weckler, "Integrated arrays of silicon phtodetectors for image sensing," IEEE Trans. Electron Devices, vol. ED-15, No. 4, Apr. 1968 196-201.

J.I. Nakamura et al., "CMOS active pixel image sensor with simple floating gate pixels," IEEE Trans. Electron Devices,. vol. 42, No. 9, Sep. 1995, pp. 1693-1694.

E-S Eid et al., "A 256×256 CMOS active pixel image sensor," SPIE, vol. 2415, Sep. 1995.

H. Yamashita et al., "A ⅔-in 2 million pixel Stack-CCD HDTV imager," IEEE JSSC, vol. 30, No. 8, Aug. 1995, pp. 881-889.

R.H. Nixon et al., "256×256 CMOS active pixel sensor camera-on-a-chip," IEEE JSCC, vol. 31, No. 12, Dec. 1996.

B. Dierickx et al., "Random addressable active pixel image sensors," SPIE, vol. 2950, Aug. 1996, pp. 2-7.

D. Scheffer et al., "Random addressable 2048×2048 active pixel image sensor," IEEE Trans. Elec. Devices, vol. 44, No. 10, Oct. 1997, pp. 1716-1720.

Y. Lida et al., "A¼-inch 330k square pixel progressive scan CMOS active pixel image sensor," IEEE JSSC, vol. 32, No. 11, Nov. 1997, pp. 2042-2047.

T. Nomoto et al., "A 4M-pixel CMD image sensor with block and skip access capability," IEEE Trans. Electron. Devices, vol. 44, No. 10, Oct. 1997, 1738-1746.

S. Ohsawa et al., "Analysis of low fixed pattern noise cell structures for photoconversion layer overlaid CCD or CMOS image sensors," IEEE Trans. electron. Devices, vol. 44, No. 10, Oct. 1997.

s. Kerneny et al., "CMOS active pixel sensor array with programmable multiresolution readout," JPL, California Institute of Technology, 1994.

Chamberlain S.G. and Lee J.P., "A Novel Wide Dynamic Range Silicon Photodetector and Linear Imaging Array", IEEE Transactions on Electron Device, vol. Ed. 31, No. 2, Feb. 1984, pp. 175-182.

Chen S. and Ginosar R., "Adaptive Sensitivity CCD Image Sensor", Charge-Coupled Devices and Solid State Optical Sensors V, Proc. SPIE vol. 2415, pp. 303-309, 1984.

Delbruck T. and C. Mead, "Analog VLSI Phototransduction by Continuous-Time, Adaptive, Logarithmic Photoreceptor Circuits", Tech. Rep. California Institute of Technology, Pasadena California 91125, 1994. URL:http://www.pcmp.caltech.edu/anaprose/tobi/recep/.

* cited by examiner

DYNAMIC RANGE COMPRESSION METHOD

FIELD OF THE INVENTION

The present invention relates to methods and apparatus for controlling pixels in image sensors generally and per pixel manipulation in particular.

BACKGROUND OF THE INVENTION

FIG. 1 depicts a prior art charge integration pixel 10 located at the i-th row and a j-th column of a vision sensor (not shown). Pixel 10 comprises a photodetector represented by current source $I_{ph}(i,j)$, a switch 12, a capacitor 14 and a readout circuit 16. Switch 12 may be any type of sample and hold a device such as a semiconductor. Capacitor 14 functions as a storage device or, specifically, as an integration capacitor.

Pixel 10 generates photocurrent $I_{ph}(i,j)$, which is generally proportional to the intensity of the light impinging on the photodetector. When closed, switch 12 conducts photocurrent $I_{ph}(i,j)$ and charges the capacitor 14. In some embodiments, prior to charge integration, capacitor 14 is completely discharged. In this instance, initial voltage $V_{initial}$ across the capacitor 14 is 0 and rises linearly with the accumulation of charge.

If photocurrent $I_{ph}(i,j)$ is time invariant during charge integration, and if switch 12 is shut for an exposure time $t=t_E(i,j)$, then an accumulated charge $Q^a$ may be calculated as per equation (1).

$$Q^a(i,j) = I_{ph}(i,j) \cdot t_E(i,j) \tag{1}$$

The accumulated voltage $V^c(i,j)$ across capacitor 14 is:

$$V^c(i,j) = \frac{I_{ph}(i,j) \cdot t_E(i,j)}{C_I} \tag{2}$$

where $C_1$ is the capacitance of capacitor 14.

Proof for the following is described in full in the attached Appendix. Herein are some of the equations necessary for understanding the present invention. For ease of understanding, the equation numbers in the specification correspond to those in the Appendix.

The ratio between the saturation voltage $$V^c_{Sat}$$

and the cutoff voltage $$V^c_{Co}$$

is defined in equation (5) as the electrical signal dynamic range $DR^S$.

$$DR^S = \frac{V^c_{Sat}}{V^c_{Co}} \tag{5}$$

From the Appendix it can be seen that for conventional sensors with global exposure time setting, the captured image dynamic range $DR^L$ can be defined as in equation (12), $$DR^L = \frac{V^c_{Sat}}{V^c_{Co}} \tag{12}$$

For prior art image sensors with globally set exposure time, the captured image dynamic range $DR^L$ is equal to the electric signal dynamic range $DR^S$ and is exposure time invariant.

Some image sensors have individually per-pixel-controlled electronic shutters, such as those described in U.S. patent applications Ser. No. 09/426,452 "Image Sensor's Unit Cell with Individually Controllable Electronic Shutter Circuit" and Ser. No. 09/516,168 "Image Sensor Architecture for Per-Pixel Charge Integration Control". For those image sensors, the captured image dynamic range can be shown by equation (17):

$$DR^L = DR^S \cdot DR^T \tag{17}$$

where the shutter or exposure time dynamic range $DR^T$ is the ratio of the maximum to the minimum exposure time $T^E$.

$$DR^T = \frac{t_E^{max}}{t_E^{min}} \tag{18}$$

One result from (12) and (17) is that for image sensors with per-pixel-controlled electronic shutters, the captured scene dynamic range $DR^L$ may be at most an electrical signal dynamic range $DR^S$ times better than the prior art image sensor's dynamic range. For instance, if the electric signal dynamic range $DR^S$ is 1,000:1, and the exposure time setup is in the same, then the captured scene dynamic range $DR^L$ can be 1,000,000:1, or about 120 db. Thus there is still an incentive to improve the electrical signal dynamic range, since it directly affects the results for image sensors with per-pixel-controlled electronic shutters.

In image sensors with per-pixel exposure time control, since the dynamic range is time dependant and can be significantly improved by efficient management of the exposure time $t_E$, there is a need to develop a method and apparatus for definition of a generally optimal exposure time per cell, or pixel.

SUMMARY

There is therefore provided, in accordance with an embodiment of the present invention, a method for compressing the dynamic range of an image sensor including a multiplicity of pixels. The method includes the steps of exposing each of the pixels to light and producing an associated photocurrent per pixel, representative of the light exposure. Then, on a per-pixel basis, controlling exposure time of each the pixels on the basis of a monotonically rising convex function of the associated photocurrent of each the pixel.

The method may further include calculating the exposure time of each the pixel on the basis of the monotonically rising convex function and/or calculating the exposure time of each the pixel on the basis of the associated photocurrent. The method may also include calculating a first derivative of the monotonically rising convex function based upon a desired sensitivity of the exposure time of each the pixel.

The step of controlling may include storing the calculated exposure times per pixel, accessing the stored exposure times from the memory, and programming the pixels according to the accessed exposure times.

The method may further include accumulating charge generally linearly representative of the photocurrent and calculating the photocurrent as a product of the accumulated charge.

There is therefore provided, in accordance with an embodiment of the present invention, an exposure controller for use in an image sensor including a multiplicity of pixels. The controller may include a memory, a per-pixel parameter and a processor. The memory may store calculated exposure time values. The per-pixel parameter table may contain local parameters of the pixels. The processor may combine, based on a set of convergence criteria, the stored exposure time values and the parameters in order to determine, on a per-pixel basis, an exposure time of-the pixels.

The set of convergence criteria may be based on a set of algorithms capable of deriving an appropriate exposure time for every pixel based on the monotonically rising convex function. The set of algorithms may be capable of deriving a fine tuned exposure time of the pixels.

The exposure controller may be a chip-set external to the image sensor, or alternatively, at least partially integrated on the same substrate as the image sensor.

BRIEF DESCRIPTION OF THE DRAWINGS

The present invention will be understood and appreciated more fully from the following detailed description taken in conjunction with the drawings, in which.

DETAILED DESCRIPTION

The present invention is a method for controlling dynamic range compression via usage of a monotonically rising convex function. The present specification outlines a set of methods, analytical and tabular functions, and algorithms for capturing images. The methods and algorithms described herein may be used in conjunction with the image sensors described in U.S. patent applications Ser. No. 09/426,452 "Image Sensor's Unit Cell with Individually Controllable Electronic Shutter Circuit" and Ser. No. 09/516,168 "Image Sensor Architecture for Per-Pixel Charge Integration Control", or with other image sensors capable of per-pixel electronic shutter control. The present invention may be applied to generally dynamic range compression.

In one embodiment of the present invention each pixel's exposure is controlled on the basis of its photocurrent, and is done in a way that allows implementation of a desirable dynamic range compression function.

Another embodiment of the present invention is a per-pixel exposure control hardware/firmware/software apparatus and an exposure time processor usable to derive the per-pixel electronic shutter value.

The present invention defines a class of dynamic range compression functions selectable from a generally infinite set of functions The class of functions exclusively used for compression is mathematically defined as monotonically rising convex functions, or functions which fulfill the following conditions: for $I_{ph1} > I_{ph2}$, $f(I_{ph1}) > f(I_{ph2})$, and $f'(I_{ph1}) < f'(I_{ph2})$, where f' is the first derivative of the function f by its argument $I_{ph}$. Thus the derivative function is a monotonically falling function.

Out of an infinite range of possibilities, only the logarithmic function of the kind $f(I_{ph}) = c_1 + c_2 \cdot \log_{10}(I_{ph})$ is known to be used in prior art image sensors. This function is implemented in logarithmic sensors; thus the sensors are capable of a logarithmic response but are incapable of individual per-pixel electronic shutter control.

Figure 3:
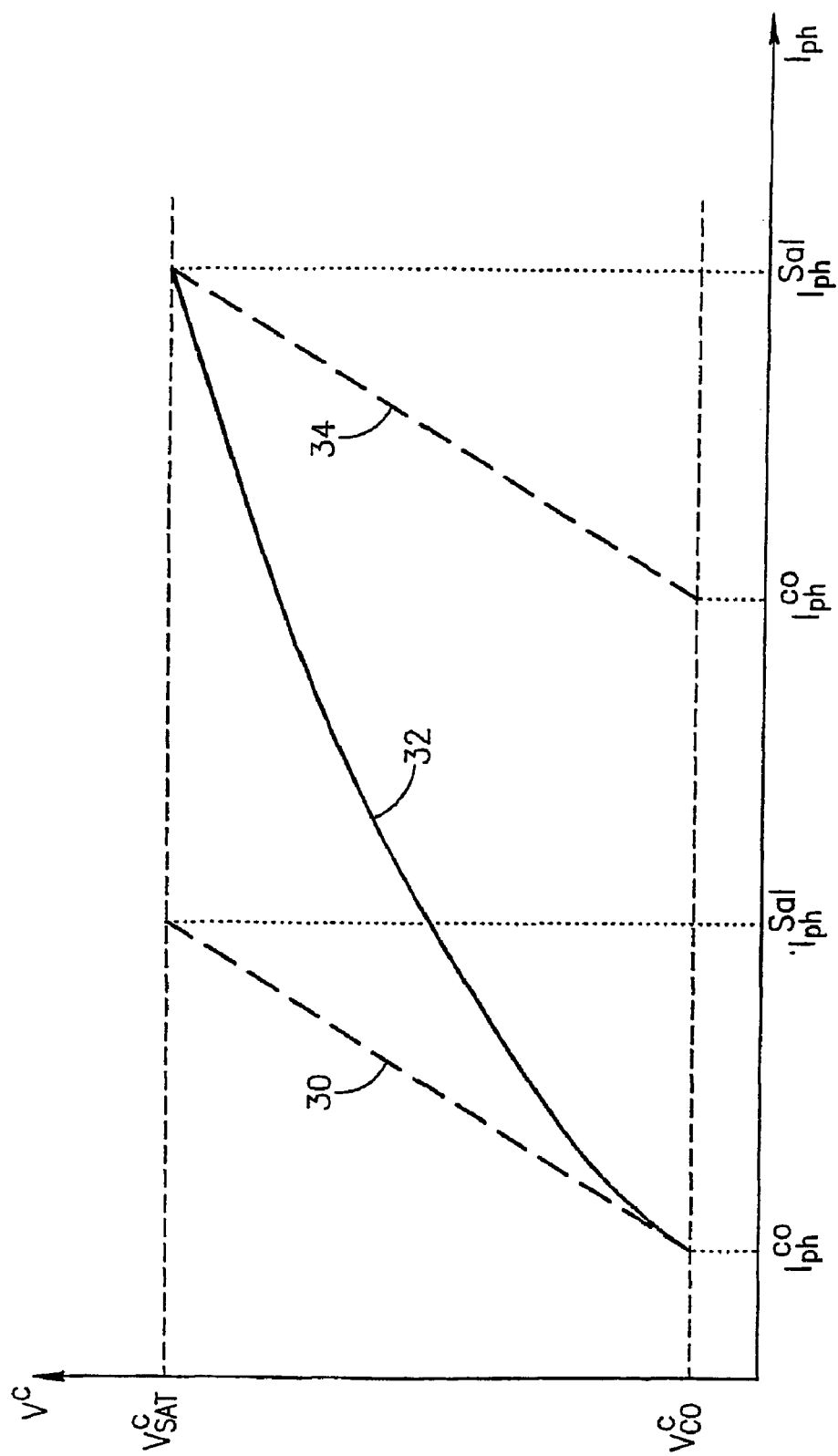
FIG. 3 depicts the dynamic range compression function $V^c = f(I_{ph})$.

FIG. 3 depicts three different functions for varying exposure times $t_E$, including a representation of a dynamic range compression function $V^c = f(I_{ph})$ useful in the shaping of the response in a pixel or unit cell. Typically, the function may be a monotonically rising convex function of $I_{ph}$.

A linear representation 30 illustrates the accumulated voltage $V^c$ when exposure time $t_E = t_E^{MIN}$. A linear representation 34 illustrates the accumulated voltage $V^c$ when the exposure time $t_E = t_E^{MAX}$. Finally, a linear representation 32 illustrates the accumulated voltage $V^c$ according to the monotonically rising convex function. For representation 32, when photocurrent $I_{ph1} > I_{ph2}$ is in the cutoff photocurrent $I_{ph}^{CO}$ to saturation photocurrent $I_{ph}^{Sat}$ range:

$$f(I_{ph1}) > f(I_{ph2}), \text{ and} \tag{23}$$

$$\left. \frac{df(I_{ph})}{dI_{ph}} \right|_{I_{ph}=I_{ph1}} < \left. \frac{df(I_{ph})}{dI_{ph}} \right|_{I_{ph}=I_{ph2}} \tag{24}$$

The monotonically rising characteristics of the function ensure that original scene features are preserved.

The monotonically falling characteristics of the first derivative result in larger accumulated voltage $V^c$ increments for photocurrents $I_{ph}$ closer to the cutoff photocurrent $I_{ph}^{CO}$, which equates to weaker light intensity signals. Conversely, the voltage $V^c$ increments are smaller for photocurrents $I_{ph}$ closer to saturation photocurrent $I_{ph}^{Sat}$, which equates to stronger signals. This results in generating greater signal swings for the weaker signals around the level of cutoff photocurrent $I_{ph}^{CO}$ and smaller swings for the stronger signals around the saturation photocurrent $I_{ph}^{Sat}$.

The first derivative of the function thus produces a change in the accumulated voltage $V^c$ as a result of a change in photocurrent $I_{ph}$, and may be defined as a sensitivity function $S(I_{ph})$, where, $$S(I_{ph}) = \frac{df(I_{ph})}{dI_{ph}} \quad (25)$$

For some applications it is desirable that the sensitivity be high at or close to the cutoff photocurrent $I_{ph}^{CO}$. This is advantageous even allowing for the tradeoff of less sensitivity closer to the saturation photocurrent $I_{ph}^{Sat}$ where stronger light-intensity swings are anticipated.

Please note that although the sensitivity itself is compression function dependant, the maximum captured scene dynamic range $DR^L$ is not, as has been demonstrated in formulas (17) and (18).

Another feature of the monotonically rising convex function is that there is a one-to-one correspondence between the accumulated voltage $V^c$ function values and the photocurrent $I_{ph}$ function. The monotonically rising convex function is inverse only in the range between cutoff and saturation photocurrents $I_{ph}^{CO}$ and $I_{ph}^{Sat}$. This means that there exists a function $f^1$ for which, $$I_{ph1} = f^{-1}(V^c), \text{ in the range } [V^c_{CO}, V^c_{Sat}] \quad (26)$$

Figure 1:
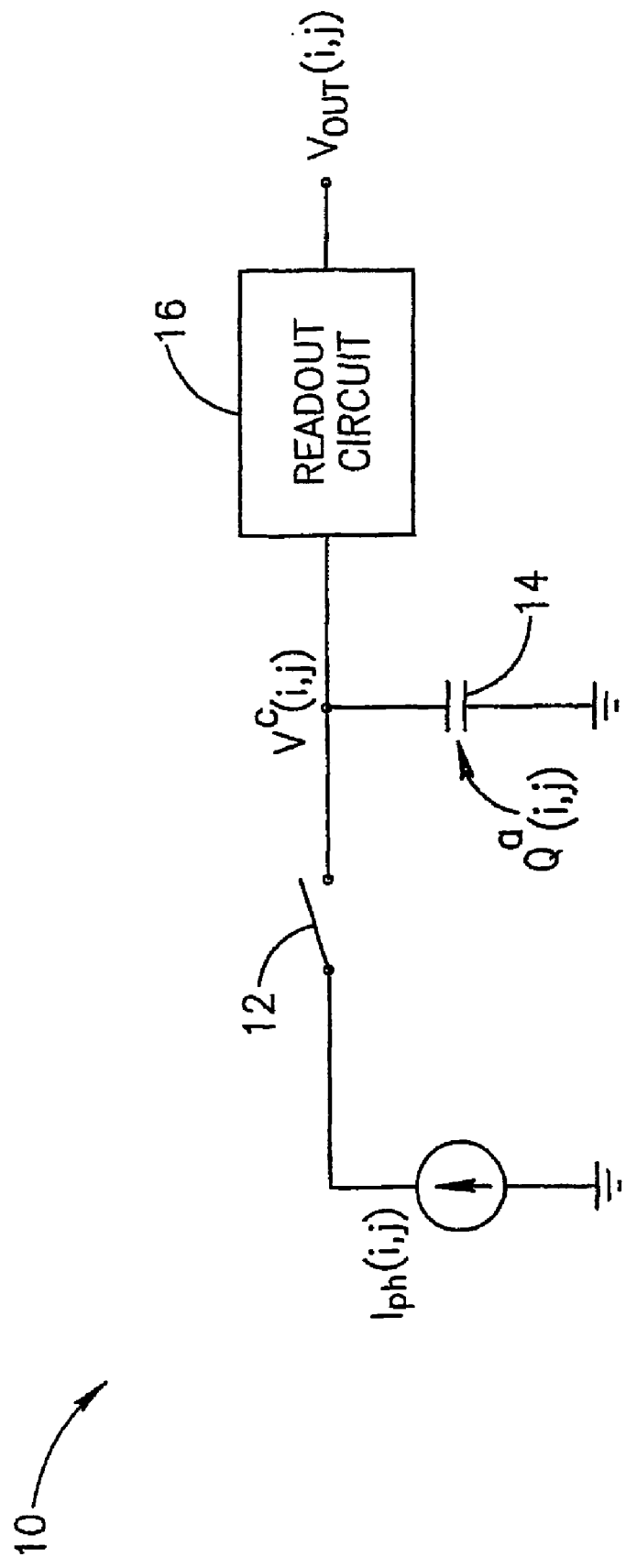
FIG. 1 depicts a prior-art charge integration pixel located at the i-th row and a j-th column of a vision sensor.

It is important to note that this feature enables the calculation of photocurrent $I_{ph}$ on the basis of a measurable voltage $V^c$ (FIG. 1). This in-turn allows for determining the exposure time $t_E$ for every pixel, to be described hereinbelow.

The dynamic range compression function can be selected to meet the required performance or the observer's taste. Included within the scope of this invention are other applicable functions that are of the monotonically rising, convex type, which can be presented either in an analytical or in a tabular form. While prior art has emphasized the usage of logarithmic functions, it is asserted that alternative functions, such as the monotonically rising convex function, are applicable.

Logarithmic function, such as that followed by the human eye's retina response, is well-known and widely used. For the logarithmic function, which spans the entire dynamic range, it can be demonstrated that, $$V^c(I_{ph}) = f(I_{ph}) = \frac{V^c_{Sat} \cdot \log_{10}\frac{I_{ph}}{I_{ph}^{CO}} + V^c_{CO} \cdot \log_{10}\frac{I_{ph}^{Sat}}{I_{ph}}}{\log_{10}\frac{I_{ph}^{Sat}}{I_{ph}^{CO}}} \quad (27)$$

and, $$S(I_{ph}) = \frac{V^c_{Sat} - V^c_{CO}}{\log_{10}e \cdot \log_{10}\frac{I_{ph}^{Sat}}{I_{ph}^{CO}}} \cdot \frac{1}{I_{ph}} \quad (28)$$

Thus, for a logarithmic dynamic range compression function, the sensitivity S is inversely proportional to photocurrent $I_{ph}$ or inversely proportional to the light intensity.

One method for shaping the dynamic range to meet the required compression function is described now. The present invention describes a method and apparatus for setting the exposure time $t_E$ for each pixel to accomplish a high dynamic range which complies with the selected dynamic range compression function on one hand and with the captured scene on the other.

Figure 4A:
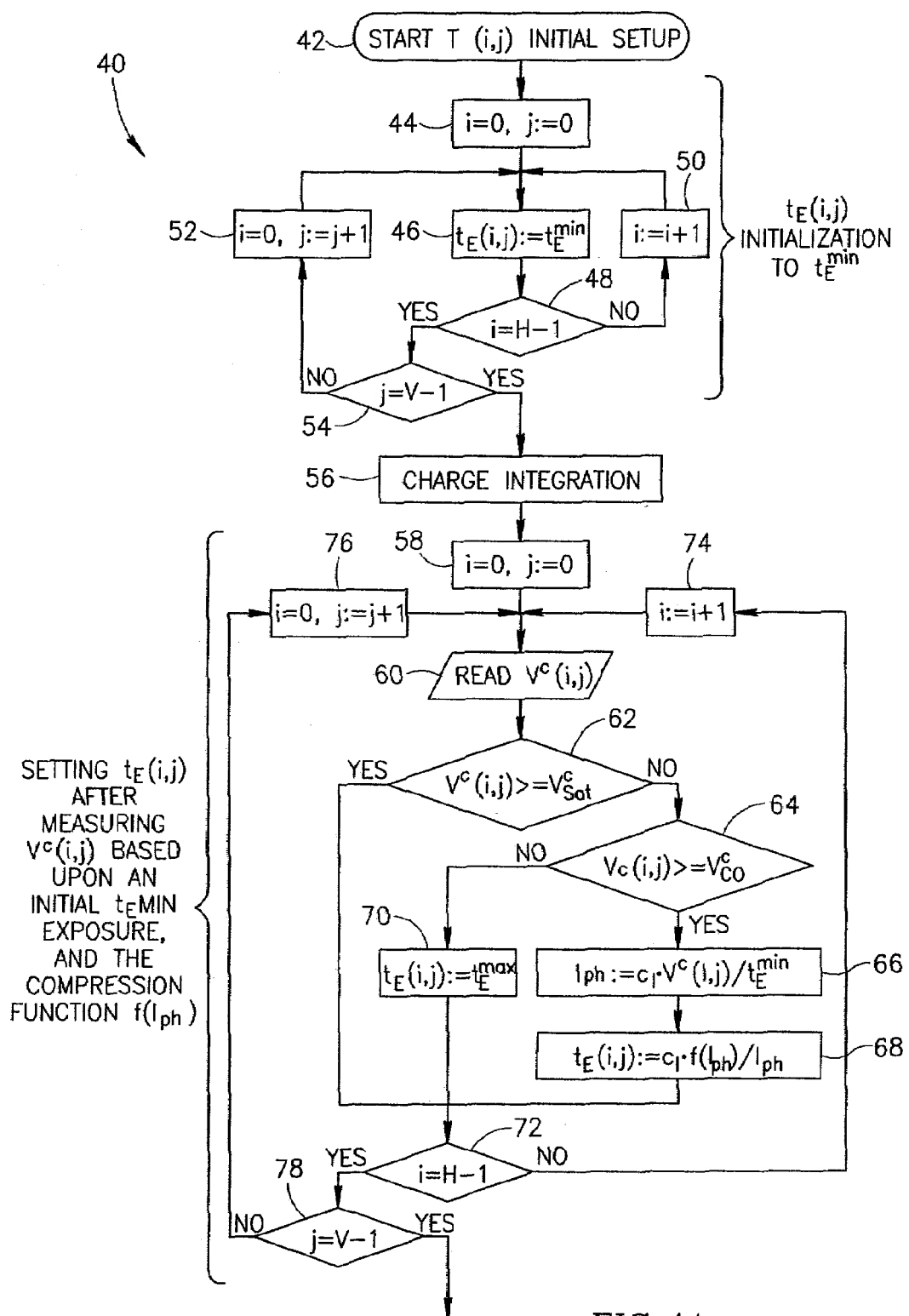
FIGS. 4A/B details one embodiment of an initial setup algorithm.

The exposure time setup may be divided into two parts, an initial setup and fine tuning, illustrated in FIGS. 4A/B and 5 respectively.

Reference is now made to FIGS. 4A/B, a block diagram illustrating an initial setup process 40. Process 40 comprises three phases: a charge integration phase (steps 42-56), an identification of always-off pixels phase (steps 58-80) and an identification of always-on pixels phase (steps 82-102).

Charge integration phase: Process 40 commences (step 42) with selection of the pixel at location (i=0, j=0) (step 44). The time exposure $t_E$ of the pixel at (i=0, j=0) is set to $t_E^{MIN}$ (step 46). Via steps 48-54, process 40 increments from pixel to pixel along both the V and the H axis, setting the time exposure $t_E$ of each pixel to $t_E^{MIN}$. The loop of steps 46-54 is completed when the time exposure $t_E$ of the last pixel at the location (i=H−1, j=V−1) (steps 48 and 54, respectively) is set to $t_E^{MIN}$. In step 56 an image is captured and there is charge integration of all the pixels.

It is noted that, similarly, process 40 could commence with initializing all the pixels to $t_E^{max}$ rather than to $t_E^{min}$.

Identification of the "Always off" Pixels (always saturated). This phase commences with selection of the pixel at location (i=0, j=0) (step 58). In step 60, the voltage $V^c$ of the pixel is read. If the voltage $V_c$ accumulated (during the exposure time $t_E^{min}$) is greater than or equal to the saturation value $V^c_{Sat}$ (step 62), their exposure setup is left unchanged at $t_E^{min}$.

It is noted that the assumption is that the voltage $V^c(i,j)$ over the integration capacitor is directly measurable. Alternatively, even without this assumption, an output voltage $V_{Out}(i,j)$—video output signal may represent the $V^c(i,j)$. There are also $V_{Out}$ values that correspond to $V^c_{CO}$, and $V^c_{Sat}$.

For pixels whose voltage $V^c(i,j)$ is in the linear range, e.g. $V^c_{CO} \leq V^c(i,j) \leq V^c_{Sat}$, (step 64) the photocurrent $I_{ph}$ is calculated (step 66), and the exposure time $t_E$ is adjusted (step 68) to match the dynamic range compression function $f(I_{ph})$. Pixels that fall below the cutoff (step 64) are assigned maximal exposure time $t_E^{max}$ (step 70).

Via steps 72-78, the process 40 increments from pixel to pixel along both the V and the H axis, repeating steps 60-70, as appropriate, until the last pixel at the location (i=H−1, j=V−1) (steps 72 and 78, respectively) are assigned an exposure time. In step 80 an image is captured and there is charge integration of all the pixels.

Identification of the "Always On" Pixels. This phase commences with selection of the pixel at location (i=0, j=0) (step 82). Only pixels that were at cutoff in the previous cycle are checked, e.g. those pixels whose exposure time is set to $t_E^{max}$ in step 70. In an alternative embodiment, all the pixels may be rechecked.

In step 84, the voltage $V^c$ of the pixel is read. If the measured $V^c(i,j)$ is below the cutoff ($V^c(i,j)<V^c_{CO}$) (step 88), the exposure time is left at maximum, i.e. $t_E^{max}$. If the measured value is in the linear range (step 88), the photocurrent $I_{ph}$ is calculated (step 90) and the estimated time $t_E(i,j)$ is adjusted (step 92) to match the dynamic range compression function $f(I_{ph})$.

Via steps 94-100, process 40 increments from pixel to pixel along both the V and the H axis, repeating steps 84-92, as appropriate until the last pixel at the location (i=H-1, j=V-1) (steps 94 and 100, respectively) are assigned an exposure time. Process 40 ends at step 102.

Figure 5:
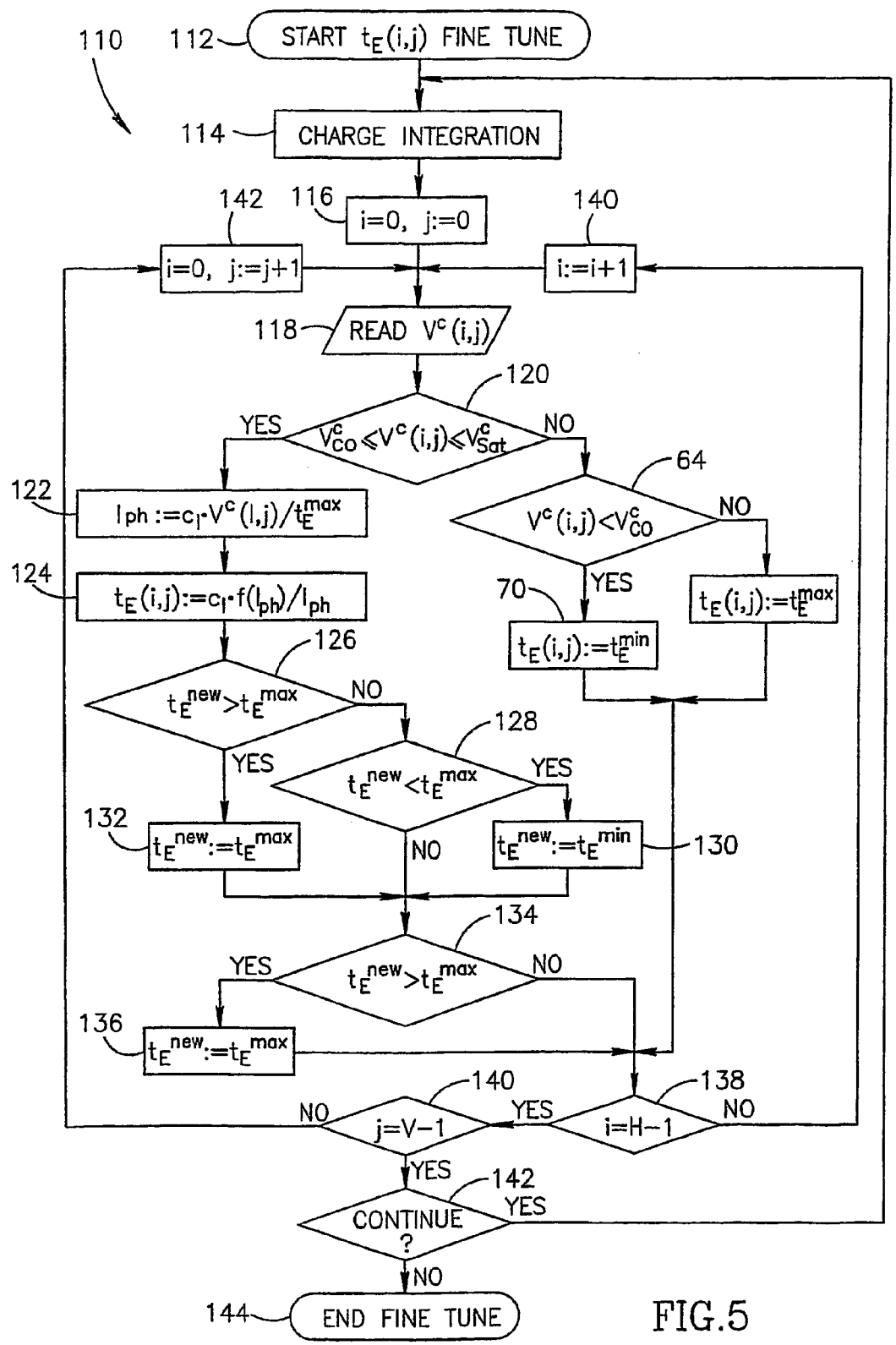
FIG. 5 details one embodiment of a fine tune algorithm to be used in conjunction with the algorithm of FIG. 4.

Reference is now made to FIG. 5, a block diagram illustrating a fine tuning process 110. During process 110 corrections are made to those pixels that fall within the linear operation range. The corrections are performed cyclically for all the pixels, such that the match-up to the dynamic range compression function is improved. The corrections may be aborted if a desirable convergence is accomplished or based upon other criteria or considerations.

In theory, an image sensor behaves linearly and the integration capacitor's voltage rises linearly with time for a constant photocurrent $I_{ph}$ between the cutoff and saturation photocurrent $I_{ph}^{CO}$ and $I_{ph}^{Sat}$, respectively. In this case, the photocurrent $I_{ph}$ derived during the initial setup process 40 may be generally precise. Also, the exposure time $t_E$ derived to match the desired dynamic range compression function is generally accurate.

In practice, the linearity assumption may be correct to the first order approximation. Also, the integration capacitor value $C_I$ may vary somewhat with voltage $V^C$ and with pixel location.

The method described in FIG. 5 is adapted to account for inaccuracies and to finely tune the exposure time $t_E$ to compensate for non-linearity and for skews. The method is based on the accurate tracking by the voltage $V^c$ of the dynamic range compression function.

The method corrects the exposure time $t^E$ values until the disparity between the measured integration capacitor's voltage $V^C$ and the dynamic range compression function value reaches a desirable accuracy.

It is noted that when the $f(I_{ph})$ function value is equal to the measured voltage $V^c(i,j)$, the current exposure time $t_E(i,j)$ and the new calculated exposure time $t_E^{new}$ are the same. The method also takes into account-that during the process of tuning the exposure time $t_E(i,j)$, the accumulated voltage $V^c(i,j)$ may exceed the "linear" range and corrects the exposure time $t_E$ accordingly.

Process 110 starts (step 112) with the assumption that the exposure time for each pixel has been initially set as described in process 40. Then, an image capture takes place, e.g. charge integration (step 114). In step 116 the process commences with the pixels at location (i=0, j=0) and the voltage $V^c$ is read (step 118). If the $V^c(i,j)$ falls into the linear range (step 120), an exposure time $t_E$ correction takes place (steps 122-124), First, photocurrent $I_{ph}$ is calculated on the basis of the measured $V^c(i,j)$ and the integration capacitor capacitance $C_I$ (step 122). A new exposure time $t_E^{new}$ is then calculated to adjust for the measured integration capacitor voltage $V^c$ (step 124).

The new exposure time $t_E^{new}$ is checked to see if it falls in the exposure time range of $[t_E^{min}, t_E^{max}]$ (step 126). If the newly calculated exposure time is below the minimum (step 128), it is set to $t_E^{min}$ (step 130). If it is above the maximum, it is set to $t_E^{max}$ (step 132). If the exposure time $t_E^{new}$ is in the exposure time range of $[t_E^{min}, t_E^{max}]$, and if the difference between the exposure time $t_E^{new}$ and the current value $t_E$ is greater than $\epsilon t_E$ (step 134), the current exposure time $t_E$ value is replaced with the newly calculated value $t_E^{new}$. $\epsilon t_E$ is an empirically set programmable value.

After the entire array is scanned (steps 138-142 are used for incrementation of the pixels, and steps 118 to 138 are repeated for all pixels), a decision is made (step 142) whether to continue or discontinue (step 144) the fine-tune process. This decision may be based upon reaching a desirable convergence criteria, in average, or in the worst case. Also, the decision may be based upon the observers subjective impression.

The exposure time fine-tuning method 1110 is one representation of many potential variations, all of which are encompassed by the principles of the present invention. Alternatives or variations to the present invention are as follows:

Per-pixel parametric tables: The capacitance $c_I$, saturation voltage $V^c_{Sat}$, cutoff voltage $V^c_{CO}$, and other parameters which might vary with the pixel location, may be determined on a per-pixel basis and stored in the image-sensor's pixel-associated memory tables (not shown). The methods described here above and similar methods may be modified accordingly.

The photocurrent $I_{ph}$ and the exposure time $t_E$ may be calculated using local parameters rather than global constants. That is, capacitance $C_I$, saturation voltage $V^c_{Sat}$, cutoff voltage $V^c_{CO}$ may be replaced by $C_I(i,j)$, $V_c^{Sat}(i,j)$, and $V^c_{CO}(i,j)$ respectively. This may result in a faster convergence.

Accounting for noise: Due to noise, the exposure time $t_E$ may fluctuate. In order to reduce noise dependant fluctuations, the evaluation of the new exposure time $t_E^{new}$ may be modified as follows:

$$t_E^{new} = \frac{N(i,j) - 1 + \frac{f(I_{ph})}{V^c(i,j)}}{N(i,j)} \cdot t_E(i,j) \qquad (29)$$

where $N(i,j)$ is the number of image acquisition iterations per pixel in the (i,j) location, for which the integration capacitor's voltage $V^c$ is in the linear region.

Convergence Criteria: Convergence criteria based upon the standard deviation may be used:

$$\sigma t_E^{new}(i,j) = \qquad (30)$$

$$\frac{\{[N(i,j) - 1] \cdot [\sigma t_E(i,j)]^2 + [t_E^{new}(i,j) - t_E(i,j)]^2\}^{\frac{1}{2}}}{N(i,j)}$$

where $\sigma t_E(i,j)$, is the standard deviation in $t_E(i,j)$ after the N-1 th iteration, and $\sigma t_E^{new}(i,j)$ is the new standard deviation calculated after the current iteration. Further exposure time iterations can be stopped, if the worst case $\sigma t_E(i,j)$ for any i, and j is below a certain $\sigma t_E$ value. That is, $$\sigma t_E(i,j) < \sigma t_E, \text{ for any } 0 \leq i \leq H-1, \text{ and any } 0 \leq j \leq V-1 \quad (31)$$

Alternatively, the average exposure time deviation being below a certain $\sigma\, t_E$ value can serve as the fine-tune termination criteria, that is, $$\frac{\sum_{j=0}^{V-1} \Sigma \sum_{i=0}^{H-1} \Sigma \sigma t_E(i,j)}{H \cdot V} < \sigma t_E \quad (32)$$

The two convergence criteria may be combined. Also, the convergence criteria may be combined with the observers subjective judgement as to when the result accomplished is satisfactory.

Figure 4B:
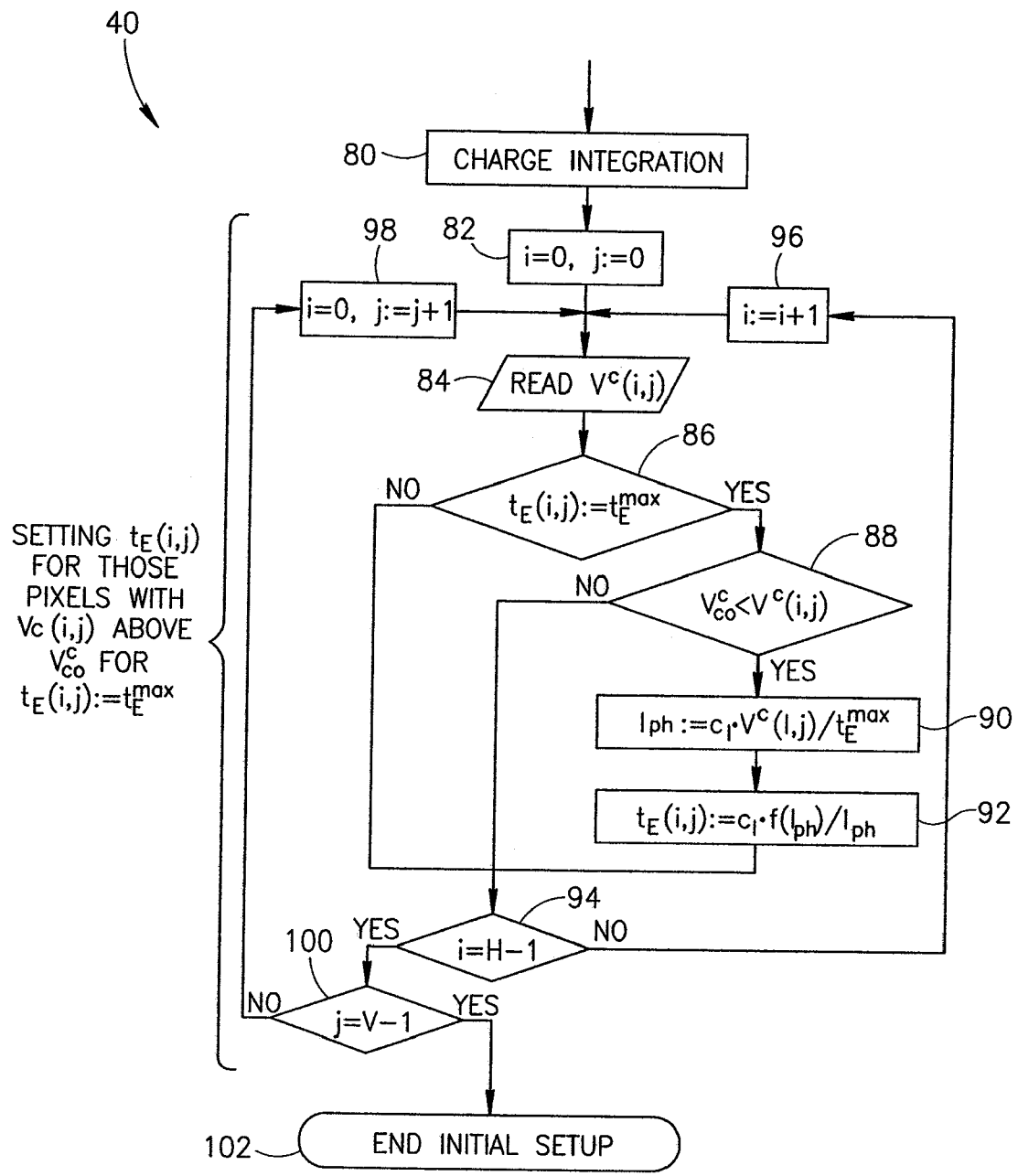
Figure 6:
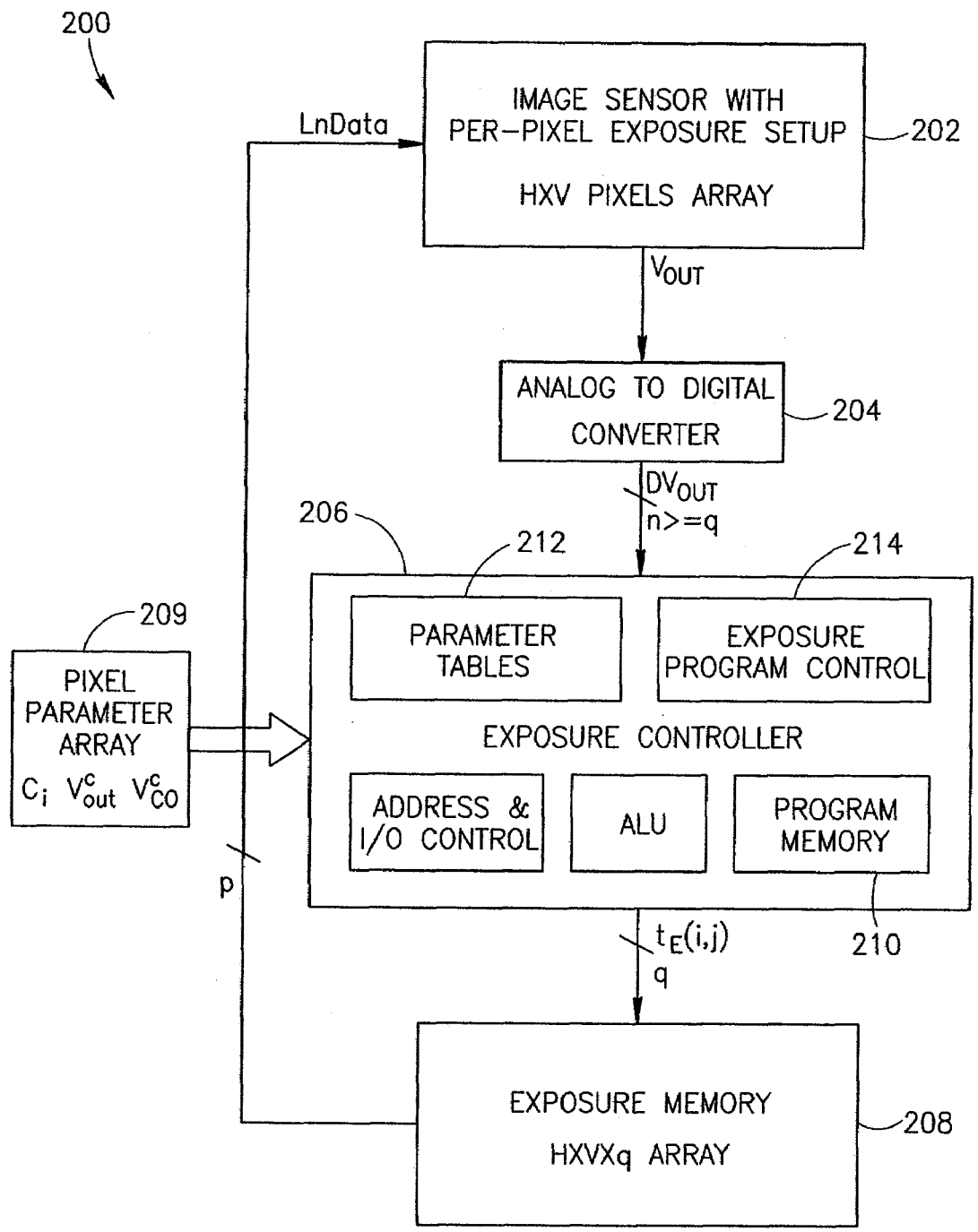
FIG. 6 is a block diagram representing the present invention as constructed and operated on an image sensor that facilitates individually controlled pixels.

Reference is now made to FIG. 6, a block diagram of a pixel electronic shutter control system 200 and associated image sensors based on the considerations and the methods presented in FIGS. 4 and 5. System 200 facilitates individually controlling each pixel.

System 200 may comprise an image sensor 202, an analog-to-digital (A-to-D) converter 204, an exposure controller 206, an exposure memory array 208 and an optional pixel parameter memory array 209.

A-to-D converter 204 may comprise an analog input that is connectable to video output of image sensor 202 for receipt of an analog video $V_{out}$. Converter 204 samples video output $V_{out}$ in-sync with the video pixel-outgoing rate, and converts the analog video $V_{out}$ into digital video $DV_{out}$. The digital video $DV_{out}$ may be output from converter 204 on the n-bit $DV_{Out}$, where n may be equal to or greater than q, the number of bits of the digitally-stored exposure time $t_E(i,j)$ values.

The exposure controller 206 receives digital video $DV_{Out}$ from the converter 204 and calculates the new set of exposure time values $t_E(i,j)$. An exposure controller program 214 may be stored in an internal or external program memory 210.

Controller 206 may calculate the photocurrent $I_{ph}$ on the basis of the digital video $DV_{Out}$. Digital video $DV_{Out}$ corresponds to voltage $V^c$, which in-turn corresponds to the integrated charge $Q_a$ stored in the capacitor.

Controller 206 may also calculate the initial and the finely-tuned exposure time value $t_E(i,j)$ to match the selected dynamic range compression function $f(I_{ph})$, for each pixel individually. These calculations may be based on processes 40 and 110. Alternatively, the dynamic range compression function $f(I_{ph})$ may be selected from a dynamic range compression function menu, such as a parameter table 212.

Controller 206 may then store the calculated q-bits wide $t_E(i,j)$ values in exposure time memory 208. The storage may be done at pixel video rate.

Memory 208 may then load the new exposure time $t_E$ into the image sensor 202. Controller 206 may control the loading.

The loading may be performed after the completion of the next-to-be-used exposure time values calculation and their storage in the exposure memory 208. Alternatively, the $t_E(i,j)$ calculations, their storage in the memory 208, and their loading to image sensor 202 may be performed concurrently. This is especially useful for real-time video image sensors that have to keep up with the video frame rate.

Controller 206 may decide whether to continue image acquisitions and subsequent exposure time calculation iterations or to stop.

Memory 208 may be an H×V memory array, which stores the q-bit $t_E(i,j)$ values.

The array may be addressed using the column, the row-, and -i, j indexes. During the charge integration process, the image sensors may be programmed by loading, in one batch for the entire image sensor array, the k-th exposure time bit, which is then subject to integration of length $T^I$. It is noted that the integration time can be of any length.

Concurrently with the integration for the k-th bit, the image sensor is programmed for the i-th bit integration. After the integration, that corresponds to the k-th bit is completed, the integration for the i-th bit can start. It is noted that the programming/integration of all the q bit-planes can be done in any sequence, and the plane bits may be loaded line after line, p bits at a time.

It is noted that each of the functions described can be integrated on the same die with the image sensor or be a part of a separate chip.

The per-pixel exposure time processor may be implemented either externally to the image sensor in a form of a chip-set, or to be partially, or fully integrated on the same substrate with the pixel.

The algorithm for the calculation on the new exposure value $t_E^{new}(i,j)$ may be based on a per pixel parameter table formulated in equation (29). It is noted that additional memory array may be required to store the N(i,j) values.

The algorithm for the calculation of the standard deviation in exposure time $\sigma\, t_E(i,j)$ formulated in equation (30) also requires an array storage for N(i,j).

An image sensor with per-pixel electronic shutter control enables individual control of each pixel's exposure time and thus allows implementation not only of dynamic range compression but many other useful effects as well. Thus, an image sensor along with the apparatus described herein, may select a variety of functions given in an analytical or a tabular form that can be used to achieve a variety of effects.

It will be appreciated by persons skilled in the art that the present invention is not limited to what has been particularly shown and described hereinabove. Rather the scope of the present invention is defined by the claims that follow:

APPENDIX

Accumulated voltage $V^c(i,j)$ complies with equation (2) in the region between a lower cutoff voltage $V^c_{CO}$ and an upper saturation voltage $V^c_{Sat}$.

Cutoff voltage $V^c_{CO}$ is typically the lowest possible voltage, in absolute potential value, that can be separated from noise. Below the cutoff value, the signals are too small to represent meaningful information and are considered to be in the cutoff region. Saturation voltage $V^c_{Sat}$ is the highest possible voltage, in absolute potential value, that does not result in signal clipping.

Although saturation voltage $V^c_{Sat}$ and cutoff voltage $V^c_{CO}$ may vary slightly due to the die, location, and process dependant skews of each individual image sensor, for the present analysis, it will be assumed that voltages $V^c_{Sa}$, and $V^c_{CO}$ are constant in their value.

Based upon equation (2) and for a specific exposure time $t_E$, the saturation photocurrent $I_{ph}^{Sat}(i,j)$ and the cutoff photocurrent $I_{ph}^{CO}(i,j)$ that cause saturation and cutoff, respectively, are:

$$(3) \quad I_{ph}^{Sat} = \frac{V^c_{Sat} \cdot C_I}{t_E}$$

$$(4) \quad I_{ph}^{CO} = \frac{V^c_{CO} \cdot C_I}{t_E}$$

The values of saturation photocurrent $I_{ph}^{Sat}(i,j)$ and cutoff photocurrent $I_{ph}^{CO}(i,j)$ define, for a specific exposure time $t_E$, the photocurrent $I_{ph}$ boundaries that define the image sensor's region of operation, and also the electronic limitations of the sensing circuit. It is noted that each image sensor may have different boundary values, resulting from variables such as quality of the optics, degree of quantum efficiency, choice of processes used to manufacture the sensor, and differing circuit designs.

The ratio between the saturation photocurrent $I_{ph}^{Sat}(i,j)$ and cutoff photocurrent $I_{ph}^{CO}(i,j)$ is defined in equation 5 as the electrical signal dynamic range $DR^s$.

(5) $$DR^s = \frac{V^c_{Sat}}{V^c_{CO}}$$

A typical image sensor's electric signal dynamic range $DR^s$ is in the order of 1000 : 1. . The dynamic range $DR^s$ is sometimes described in decibels, which is, (6) $$DR^s_{db} = 20 \cdot \log_{10} \frac{V^c_{Sat}}{V^c_{CO}}$$

For a typical image sensor, and in decibels, the electrical signal dynamic range $DR^s$ is about 60 dB.

It is noted that the electric signal dynamic range $DR^s$ is not a captured image dynamic range $DR^L$, although the two values may be the same for the some common types of image sensors. The captured image dynamic range $DR^L$ is defined as, (7) $$DR^L = \frac{\max[I^{Sat}_{ph}(i,j)]}{\min[I^{CO}_{ph}(i,j)]}$$

where $DR^L$ is the light-intensity dynamic range or the ratio between the maximum saturation photocurrent $I_{ph}^{Sat}(i,j)$ and minimum cutoff photocurrent $I_{ph}^{CO}(i,j)$, for any (i,j) in the $0 \leq i \leq V-1$ and $0 \leq j \leq H-1$ range.

For prior art image sensors, all pixels are exposed for the same exposure time $t_E$. Exposure time $t_E$ may vary in the range $t_E^{min}$ to $t_E^{max}$ where, $t_E^{min}$ is the image sensor's minimal exposure time, and $t_E^{max}$ is the image sensor's maximal exposure time.

It is noted that for the prior art image sensor the exposure time $t_E$ may vary, however all pixels vary together and their charge integration is identical.

For the purpose of analysis let us assume that the stared-at[??] scene is of extremely wide dynamic range (infinite), and is limited only by the image sensor's capabilities. For the prior art image sensors where the exposure time is set to $t_E^{min}$, the corresponding saturation and cutoff photocurrent values $I_{ph}^{Sat}$ and $I_{ph}^{CO}$ are:

$$(8) \quad \bar{I}_{ph}^{Sat} = \frac{V_{Sat}^c \cdot C_I}{t_E^{min}}$$

$$(9) \quad \bar{I}_{ph}^{CO} = \frac{V_{CO}^c \cdot C_I}{t_E^{min}}$$

For this particular situation the captured scene dynamic range DR derived from (8) and (9) is, $$(10) \quad \overline{\overline{DR}}^L = \frac{V_{Sat}^c}{V_{CO}^c}$$

Similarly, for the maximum exposure it can be derived that the dynamic range is, $$(11) \quad \underline{DR}^L = \frac{V_{Sat}^c}{V_{CO}^c}$$

and for any exposure time $t_E$ set between the minimum and the maximum, for prior art image sensors, the captured image dynamic range DR is, $$(12) \quad DR^L = \frac{V_{Sat}^c}{V_{CO}^c}$$

and thus, with globally set exposure time $t_E$, the captured image dynamic range $DR^L$ is equal to the electric signal dynamic range $DR^S$ and is exposure time invariant.

Figure 2:
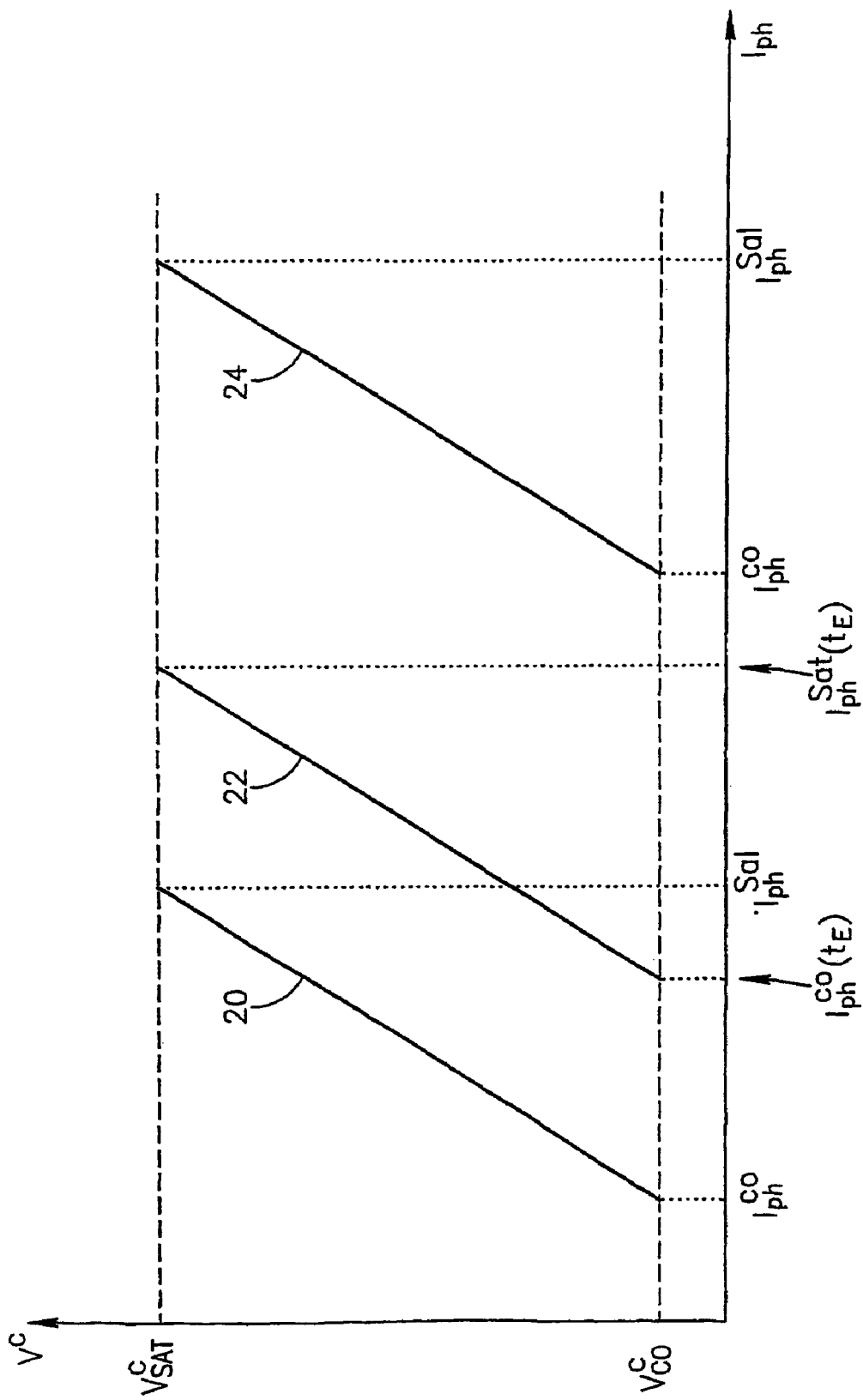
FIG. 2 is a graphic illustration (prior-art) voltage $V^c$ as a function of $I_{ph}$ and exposure time $T_E$.

Reference is now made to Fig. 2 a graphic demonstration of equation 12. Fig. 12 depicts the accumulated voltage $V^c$ as a function of photocurrent $I_{ph}$, and exposure time $t_E$ for three different voltages $V^c$. A linear representation 20 illustrates the accumulated voltage $V^c$ when exposure time $t_E = t_E^{MIN}$. A linear representation 22 illustrates the accumulated voltage $V^c$ when exposure time $t_E^{MIN} < t_E < t_E^{MAX}$. A linear representation 24 illustrates the accumulated voltage $V^c$ when the exposure time $t_E = t_E^{MAX}$.

The basic observation is that although the function of the accumulated voltage $V^c$ varies as a function of the exposure time $t_E$, the function slope is invariant, and so is the captured scene dynamic range.

In image sensors per-pixel electronic shutters the exposure time $t_E$ of each pixel can be individually set within a range of exposure times from $t_E^{min}$ to $t_E^{max}$ such that when photocurrent $I_{ph1}(i,j) > I_{ph2}(i,j)$, the exposure time $t_{E2}(i,j) < t_{E1}(i,j)$ and the accumulated voltage $V^c_2 > V^c_1$.

Based on these assumptions, the image sensor's maximum saturation photocurrent $\bar{I}_{ph}^{Sat}$ is:

$$(13) \qquad \bar{I}_{ph}^{Sat} = \frac{V_{Sat}^c \cdot C_I}{t_E^{min}}$$

and the minimum cutoff photocurrent $\underline{I}_{ph}^{CO}$ is:

$$(14) \qquad \underline{I}_{ph}^{CO} = \frac{V_{CO}^c \cdot C_I}{t_E^{max}}$$

Therefore, for image sensors with per-pixel electronic shutters, the captured scene dynamic range $DR^L$ when the shutter is set according to (13) and (14) is:

$$(15) \qquad DR^L = \frac{\bar{I}_{ph}^{Sat}}{\underline{I}_{ph}^{CO}} \text{ or,}$$

$$(16) \qquad DR^L = \frac{V_{Sat}^c}{V_{CO}^c} \cdot \frac{t_E^{max}}{t_E^{min}} \text{ or,}$$

$$(17) \qquad DR^L = DR^S \cdot DR^T, \text{ where}$$

$$(18) \qquad DR^T = \frac{t_E^{max}}{t_E^{min}}$$

Therefore, for image sensors with individually per-pixel-controlled electronic shutters, the shutter or exposure time dynamic range $DR^T$ is the ratio of the maximum to the minimum exposure time $t_E$. The electronic shutter values may be set within the exposure time range.

The maximum exposure time dynamic range $DR^T$ is a quality indicator for this type of an image sensor. It determines, along with the electrical signal dynamic range $DR^S$, the captured scene dynamic range $DR^L$.

For image sensors that support real-time video, $DR^T$ of 1,000 : 1 is feasible. For still video image sensors of this type, $DR^T$ is theoretically limitless, as there are no constraints on the total programming of the exposure time. However, there is a practical useful limit to $DR^T$.

Assuming that $DR^T > DR^S$ and that the available electric signal is utilized to the maximum, for $t_E^{min}$, $V^c = V^c_{co}$, and for $t_{Emax}$, $V^c = V^c_{Sat}$. This set-up provides complete utilization of the entire linear region. As such, $DR^T = DR^S$. For $t_E \leq t_E^{min}$, and for $t_E \ni t_{Emax}$, $V^c \leq V^c_{Sat}$, the Vc range must be set in such a way that. $V^c \ni V^c_{co}$, and $V^c \leq V^c_{Sat}$. Otherwise, the output signal infringes the saturation or/and cut-off regions, respectively. Therefore,

(19)    $DR^T \leq DR^S$, and therefore  (20)    $DR^L \leq (DR^S)^2$

One result of (19) and (20) is that for image sensors with per-pixel-controlled electronic shutters, the captured scene dynamic range $DR^L$ may be at most an electrical signal dynamic range $DR^S$ times better than the prior art image sensors' dynamic range. For instance, if the electric signal dynamic range $DR^S$ is 1,000 : 1, and the exposure time setup is in the same, then the captured scene dynamic range $DR^L$ can be 1,000,000 : 1 ,or about 120db. Thus there is still an incentive to improve the electrical signal dynamic range, since it directly affects the results for image sensors with per-pixel-controlled electronic shutters.

Dynamic range may also be expressed in decibels:

(21)    $DR^L_{db} = DR^S_{db} + DR^T_{db}$

For image sensors with per-pixel exposure time control, the following is true:

(22)    $DR^L_{db} \leq 2 \times DR^S_{db}$

The invention claimed is:

1. A method for compressing the dynamic range of an image sensor comprising a multiplicity of pixels, the method comprising the steps of:
   exposing each of said pixels to light and producing an associated photocurrent per pixel, representative of said light exposure;
   on a per-pixel basis, controlling exposure time of each of said pixels on the basis of a monotonically rising convex function of said associated photocurrent of each said pixel, wherein:
   controlling exposure time includes:
      calculating a photocurrent based on an accumulated voltage; and
      determining an exposure time, based on said monotonically rising convex function of said calculated photocurrent; and
   said monotonically rising convex function fulfills the following conditions:

for $I_{ph1} > I_{ph2}$, $f(I_{ph1}) > f(I_{ph2})$ and $f'(I_{ph1}) < f'(I_{ph2})$, where
   f represents the monotonically rising convex function;
   f' represents the first derivative of the function f; and
   $I_{ph1}$ and $I_{ph2}$ are arguments to function f and its first derivative f'.

2. The method according to claim 1, further comprising the step of storing said determined exposure time of each said pixel as a q-bit value in memory.

3. The method according to claim 2, wherein said step of controlling comprises the steps of:
   accessing said stored exposure times from a memory; and
   programming said pixels according to said accessed exposure times.

4. The method according to claim 1, further comprising calculating a first derivative of said monotonically rising convex function based upon a desired sensitivity of said exposure time of each said pixel.

5. The method according to claim 1, further comprising:
   accumulating charge generally linearly representative of said photocurrent; and
   calculating said photocurrent as a product of said accumulated charge.

6. The method according to claim 1, wherein said step of controlling is performed by circuitry outside said multiplicity of pixels.

7. An exposure controller for use in an image sensor comprising a multiplicity of pixels, the controller comprising:
   a memory for storing calculated exposure time values;
   a per-pixel parameter table containing local parameters of said pixels; and
   a processor for combining based on a set of convergence criteria, said stored exposure time values and said parameters in order to determine, on a per-pixel basis, an exposure time of said pixels, wherein:
   the processor is configured to:
      calculate a photocurrent from an accumulated voltage; and
      determine an exposure time, based on a monotonically rising convex function of said calculated photocurrent; and
   wherein said monotonically rising convex function fulfills the following conditions:

for $I_{ph1} > I_{ph2}$, $f(I_{ph1}) > f(I_{ph2})$ and $f'(I_{ph1}) < f'(I_{ph2})$, f represents the monotonically rising convex function;
   f' represents the first derivative of the function f; and
   $I_{ph1}$ and $I_{ph2}$ are arguments to function f and its first derivative f'.

8. The exposure controller of claim 7, wherein said set of convergence criteria is based on a set of algorithms capable of deriving an appropriate exposure time for every pixel based on a monotonically rising convex function.

9. The exposure controller of claim 8, wherein said set of algorithms is capable of deriving a fine tuned exposure time of said pixels.

10. The exposure controller of claim 7, wherein said exposure controller is a chip-set external to said image sensor.

11. The exposure controller of claim 7, wherein said exposure controller is at least partially integrated on the same substrate as said image sensor.

12. The exposure controller of claim 7, wherein said memory and said processor are disposed outside said plurality of pixels.

13. A method for determining an exposure time of each of a multiplicity of pixels belonging to an image sensor, the method comprising:
   initially setting an exposure time of each pixel to a minimum value $t_E^{MIN}$;
   performing a first charge integration of each pixel over said exposure time to obtain a first charge voltage $V^c$, and:
      if said first charge voltage $V^c$ is less than a cutoff voltage $V_{CO}$, adjusting the exposure time of said each pixel to a maximum value $t_E^{MAX}$; wherein $t_E^{MAX} > t_E^{MIN}$;
      if said first charge voltage $V^c$ is between said cutoff voltage $V_{CO}$ and a saturation voltage $V_{Sat}$, adjusting the exposure time of said each pixel based on a monotonically rising convex function of a photocurrent of that pixel; and
      if said first charge voltage $V^c$ is greater than the saturation voltage $V_{Sat}$, leaving the exposure time of said each pixel at $t_E^{MIN}$; and
   performing a second charge integration of each pixel whose exposure time was set to $t_E^{MAX}$ to obtain a second charge voltage, and:
      if said second charge voltage is greater than said cutoff voltage $V_{CO}$, adjusting the exposure time of said each pixel whose exposure time was set to $t_E^{MAX}$, based on a monotonically rising convex function of a photocurrent of that pixel;
   wherein said monotonically rising convex function fulfills the following conditions:

for $I_{ph1} > I_{ph2}$, $f(I_{ph1}) > f(I_{ph2})$ and $f'(I_{ph1}) < f'(I_{ph2})$,
   where:

f represents the monotonically rising convex function;
   f' represents the first derivative of the function f; and
   $I_{ph1}$ and $I_{ph2}$ are arguments to function f and its first derivative f'.

14. The method according to claim 13, further comprising:
   iteratively adjusting the exposure time of each pixel until a predetermined convergence criteria is met.

15. A method for compressing the dynamic range of an image sensor comprising a multiplicity of pixels arranged in a pixel array, the method comprising the steps of:
   for each pixel:
      exposing the pixel to light and producing an associated photocurrent representative of said light exposure;
      determining, with a processor, an exposure time of the pixel on the basis of a monotonically rising convex function of said associated photocurrent;

storing said determined exposure time as a q-bit value in memory located outside the pixel array;

accessing the stored exposure time from said memory; and programming the pixel to accumulate charge for the accessed exposure time;

wherein said monotonically rising convex function fulfills the following conditions:

for $I_{ph1} > I_{ph2}$, $f(I_{ph1}) > f(I_{ph2})$ and $f'(I_{ph1}) < f'(I_{ph2})$,
where:

f represents the monotonically rising convex function;
f' represents the first derivative of the function f; and
$I_{ph1}$ and $I_{ph2}$ are arguments to function f and its first derivative f'.

16. A pixel electronic control shutter system comprising:

an image sensor comprising a pixel array having multiplicity of pixels, the image sensor producing at least one analog output voltage in response to light received by a pixel;

an analog-to-digital converter receiving the at least one analog output voltage and outputting a corresponding digitized voltage; and an exposure controller receiving said digitized voltage from the analog-to-digital converter, the exposure controller comprising:

a memory for storing calculated exposure time values;
a per-pixel parameter table containing local parameters of said pixels; and a processor for combining based on a set of convergence criteria, said stored exposure time values and said parameters in order to determine, on a per-pixel basis, an exposure time of said pixels, wherein:

the processor is configured to:

calculate a photocurrent from said digitized voltage; and determine an exposure time, based on a monotonically rising function of said calculated photocurrent; and wherein said monotonically rising convex function fulfills the following conditions:

for $I_{ph1} > I_{ph2}$, $f(I_{ph1}) > f(I_{ph2})$ and $f'(I_{ph1}) < f'(I_{ph2})$,
where:

f represents the monotonically rising convex function;
f' represents the first derivative of the function f; and
$I_{ph1}$ and $I_{ph2}$ are arguments to function f and its first derivative f'.

17. The pixel electronic control shutter system according to claim 16, wherein:

said memory and said processor are disposed outside said plurality of pixels; and said determined exposure time is stored as a q-bit value in said memory.

* * * * *